(12) United States Patent
Keuss

(10) Patent No.: US 9,991,736 B2
(45) Date of Patent: Jun. 5, 2018

(54) CHARGE CONTROL FOR EXTERNAL MANUAL BATTERY CHARGERS

(71) Applicant: Stephen David Keuss, Brentwood, MO (US)

(72) Inventor: Stephen David Keuss, Brentwood, MO (US)

(73) Assignee: Associated Equipment Corporation, St. Louis, MO (US)

( * ) Notice: Subject to any disclaimer, the term of this patent is extended or adjusted under 35 U.S.C. 154(b) by 133 days.

(21) Appl. No.: 14/817,756

(22) Filed: Aug. 4, 2015

(65) Prior Publication Data

US 2016/0028270 A1    Jan. 28, 2016

Related U.S. Application Data

(63) Continuation of application No. 13/480,229, filed on May 24, 2012, now abandoned.

(51) Int. Cl.
*H02J 7/04*    (2006.01)
*H02J 7/16*    (2006.01)
*H02J 7/00*    (2006.01)

(52) U.S. Cl.
CPC .............. *H02J 7/04* (2013.01); *H02J 7/0021* (2013.01); *H02J 7/0052* (2013.01); *H02J 7/045* (2013.01)

(58) Field of Classification Search
USPC ........................................................ 320/162
See application file for complete search history.

(56) References Cited

U.S. PATENT DOCUMENTS

| | | | | |
|---|---|---|---|---|
| 5,737,168 A | * | 4/1998 | Baker | H02H 3/207 361/84 |
| 7,525,291 B1 | * | 4/2009 | Ferguson | H02J 7/0021 320/128 |
| 2009/0302681 A1 | * | 12/2009 | Yamada | H02J 7/35 307/46 |
| 2010/0001685 A1 | * | 1/2010 | Eastlack | H02J 7/025 320/108 |
| 2010/0259956 A1 | * | 10/2010 | Sadwick | H05B 33/0815 363/50 |
| 2011/0254511 A1 | * | 10/2011 | Tam | H02J 7/0068 320/162 |

* cited by examiner

*Primary Examiner* — Bryce Aisaka
(74) *Attorney, Agent, or Firm* — Spencer Fane LLP

(57) ABSTRACT

An apparatus for operating an external manual battery charger having a first AC power input and a DC charging output. The apparatus includes an AC controller configured to adjust at least one power parameter supplied to the AC power input of the external manual battery charger. The power parameter(s) may be any one or more of AC current, AC voltage and AC power. The apparatus further includes a feedback converter configured to monitor at least one charging parameter and to control the AC controller to adjust the one or more power parameters in accordance with the monitored charging parameter or parameters.

25 Claims, 8 Drawing Sheets

CHARGE CONTROL FOR EXTERNAL MANUAL BATTERY CHARGERS

CROSS-REFERENCE TO RELATED APPLICATIONS

This application claims the benefit of and is a continuation of prior U.S. Non-Provisional application Ser. No. 13/480,229, filed May 24, 2012, the contents of which are hereby incorporated by reference.

BACKGROUND OF THE INVENTION

This invention relates generally to manual battery chargers and more particularly, but not necessarily exclusively, to chargers for lead-acid batteries of the type commonly found in motor vehicles.

A majority of batteries that are used in automobiles are lead-acid batteries of a flooded design. These batteries are very rugged and can survive a substantial amount of abuse, including that resulting from overcharging. Sealed lead-acid batteries often are flooded batteries with large electrolyte reservoirs and one or more caps configured to recombine gasses and to return the recombined gasses to the reservoirs. In this manner, the amount of gasses lost to the atmosphere due to overcharging is limited. When helping to start a car with a weak battery using crank assist, many commercial garages take advantage of the overcharge resistance of such batteries by increasing the amount of current put into the battery to help recharge the battery and help the battery in starting the vehicle.

Newer types of sealed batteries on the market today, including absorbent glass mat (AGM) and gel cells do not require periodic watering, but do require that they be charged in a more precise manner to limit the amount of gasses that can still escape from these batteries and to prevent explosions. In addition, voltages must be limited to avoid damage to vehicle electronics and monitoring systems.

Many battery chargers in use or on the market today are manually controlled. For example, a manual battery charger may be connected to a battery, plugged in to a source of AC power, and turned on to charge a connected battery. The manual battery charger simply supplies a current to the battery that tapers off as the battery voltage increases. Although such a manual battery charger is adequate for flooded lead acid batteries, they are not adequate to provide the controlled charging of newer types of sealed batteries, or to avoid damage to vehicle electronics and monitoring systems when a battery still connected to a vehicle is being charged.

It would thus be desirable to provide apparatus and methods adequate for charging newer types of sealed batteries and to avoid damage to vehicle electronics and monitoring systems while reducing the cost of same by continuing to utilize existing manually controlled battery chargers.

SUMMARY OF THE INVENTION

In one aspect, some configurations of the present invention therefore provide an apparatus for operating an external manual battery charger having a first AC power input and a DC charging output. The apparatus includes an AC controller configured to adjust at least one power parameter supplied to the AC power input of the external manual battery charger. The power parameter(s) may be any one or more of AC current, AC voltage and AC power. The apparatus further includes a feedback converter configured to monitor at least one charging parameter and to control the AC controller to adjust the one or more power parameters in accordance with the monitored charging parameter or parameters.

In another aspect, some configurations of the present invention provide a method for charging a battery. The method includes coupling an AC power source to an external manual battery charger via a charger controller having a feedback converter. The method further includes monitoring at least one charging parameter using the feedback converter of the charger controller, and using the external manual battery charger to charge the battery while using the feedback converter to adjust a power parameter input to the external manual battery charger by the charger controller.

It will be appreciated that some configurations of the present invention provide apparatus or methods adequate for charging newer types of sealed batteries and to avoid damage to vehicle electronics and monitoring systems while reducing the cost of same by continuing to utilize existing manually controlled battery chargers.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry.

DETAILED DESCRIPTION OF THE INVENTION

Some embodiments of the present invention comprise an external module that essentially changes a manual battery charger into an automatic battery charger. Some embodiments also permit a user to switch back to a manual mode for operations requiring direct user intervention. Some embodiments of the present invention additionally determine when the charger is being used for crank assist and, if so, switch over to a bypass mode, thereby maximizing or at least increasing the output available for starting a vehicle while not damaging control circuitry in the vehicle.

Figure 1:
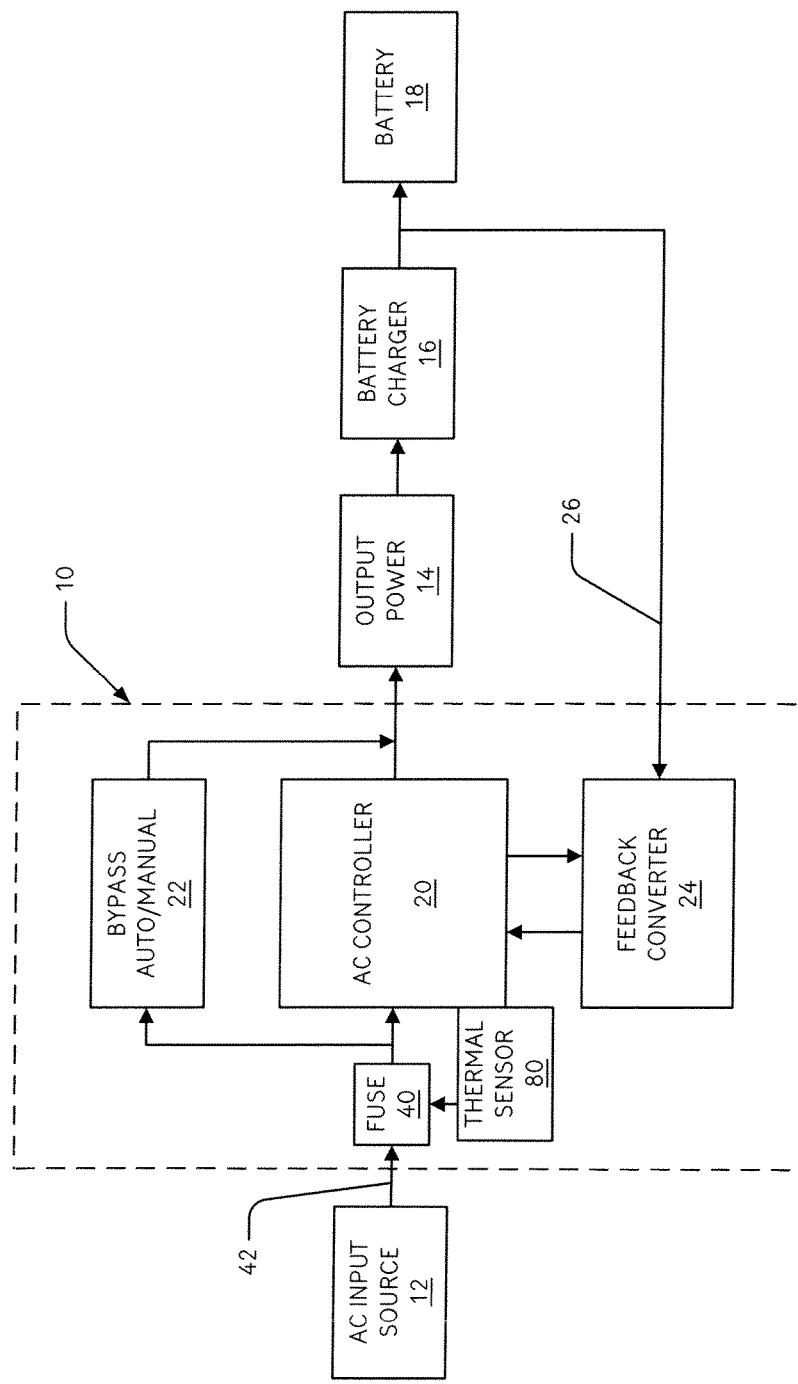
FIG. 1 is a schematic block diagram of an embodiment of the present invention and a portion of its operating environment.

In some embodiments and referring to FIG. 1, some charger controllers 10 of the present invention utilize an AC input power source 12 (such as a standard wall electrical socket) to produce a controlled output power 14 for application to an AC power input of an external manual battery charger 16. The output of external manual battery charger 16 is used, in turn, to charge a battery 18. In some embodiments and additionally referring to FIG. 2, charger controller 10 in some embodiments is housed in a box 28 of an appropriate or convenient size and shape. Included with box 28 is an AC cable 42 that can be used to conduct AC power from AC input power source 12 to charger controller 10. Output power 14 is supplied via a receptacle 44 that provides an AC power output for an external manual battery charger 16 having an AC power input. A separate set of leads 26 is provided for monitoring, for example, the battery voltage of battery 18. In the embodiment illustrated in FIG. 2, leads 26 are hardwired to charger controller 10 through box 28. An auto/manual bypass circuit 22 comprising a manual override switch 46 (or a manually controlled electronic switch) is provided in some embodiments of the present invention to bypass AC controller 20. Bypass circuit 22 is useful to prevent AC controller 20 from being damaged or destroyed by the very high current needed to provide crank assist.

Figure 2:
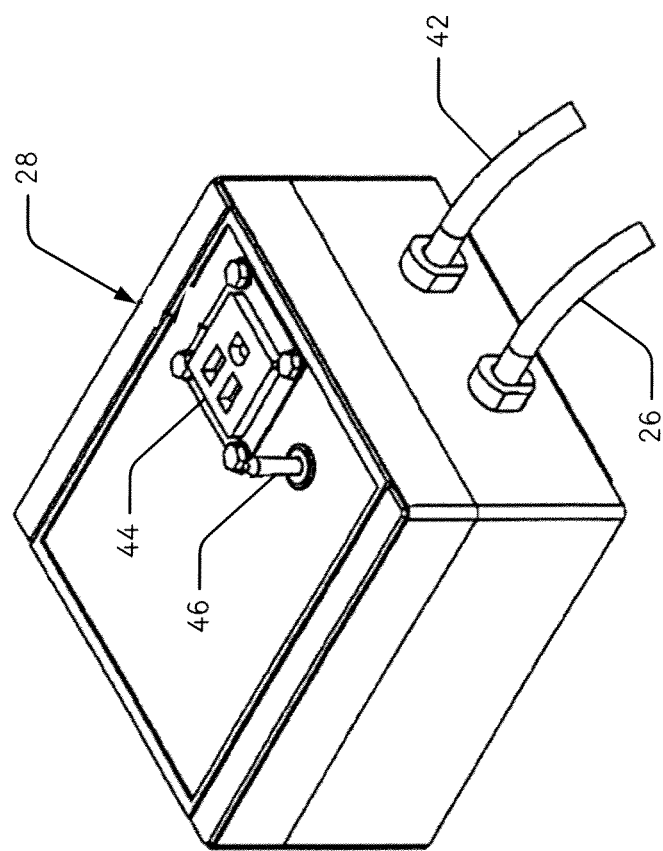
FIG. 2 is a pictorial view of an embodiment of the present invention.
Figure 3:
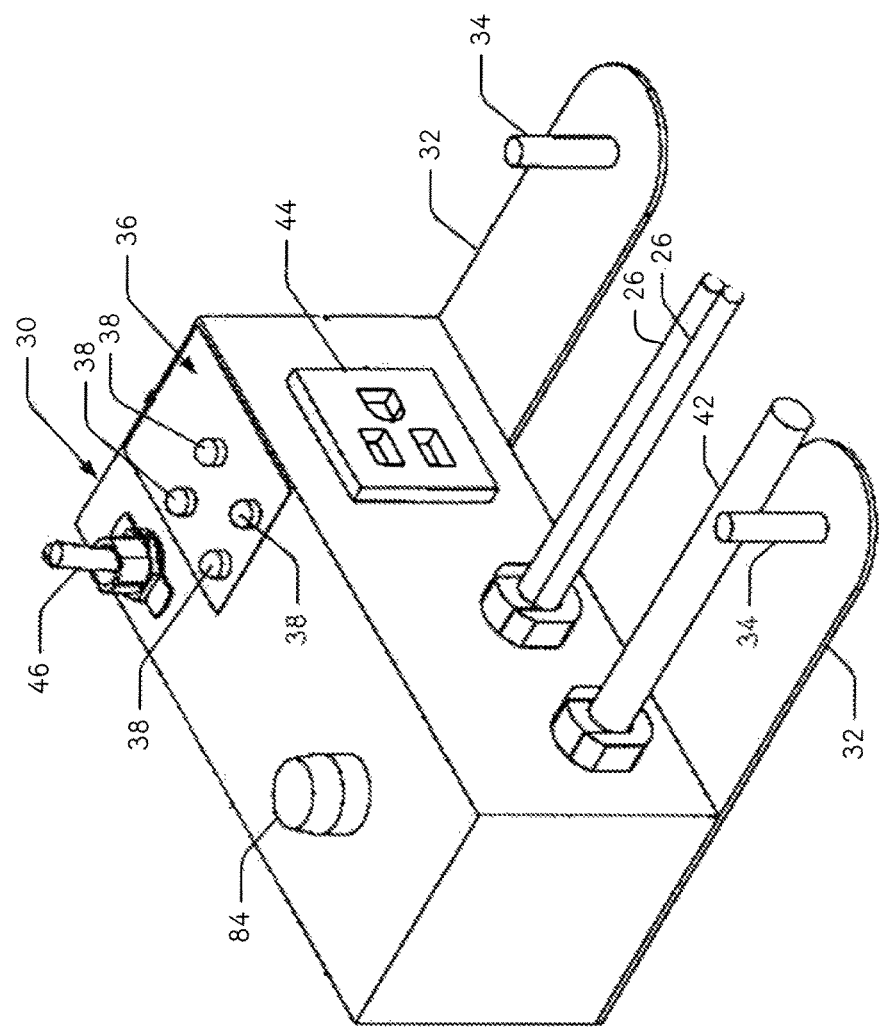
FIG. 3 is a pictorial view of another embodiment of the present invention.

In some other embodiments, and referring to FIGS. 1 and 3, charger controller 10 is enclosed in a more complex box 30 that is configured with additional features other than those shown in conjunction with box 28 of FIG. 2. In particular, box 30 of FIG. 3 includes a bracket or brackets 32 (or other enclosure) for holding an AC cord (also not shown in FIG. 3) of external manual battery charger 16. The bracket or brackets 32 or other enclosure may be permanently attached or detachable, and can include one or more posts 34 around which an excess length of the AC cord may be wrapped. More complex box 30 also includes a control panel 36 with various controls and indicators 38. Feedback converter 24 is responsive to the controls and/or controls the indicators of control panel 36 for various purposes, such as to select and/or indicate charging parameters, a battery type or model of battery 18 types, or a type or model of external manual battery charger 16. More complex box 30 also provides a holder 84 for a fuse 40. (In some embodiments, a circuit breaker is provided as a protective device instead of fuse 40, and holder 84 is a reset switch of the circuit breaker. Other protective devices such as ground fault interrupter circuits [GFICs] may be provided instead of, or in addition to fuse 40 and/or a circuit breaker.)

In some embodiments not illustrated in the Figures, hardwired leads 26 are replaced by a wireless module attached, for example, to clamps on battery 18 and a wireless receiver is used by charger controller 10 to monitor the voltage of battery 18.

Figure 4:
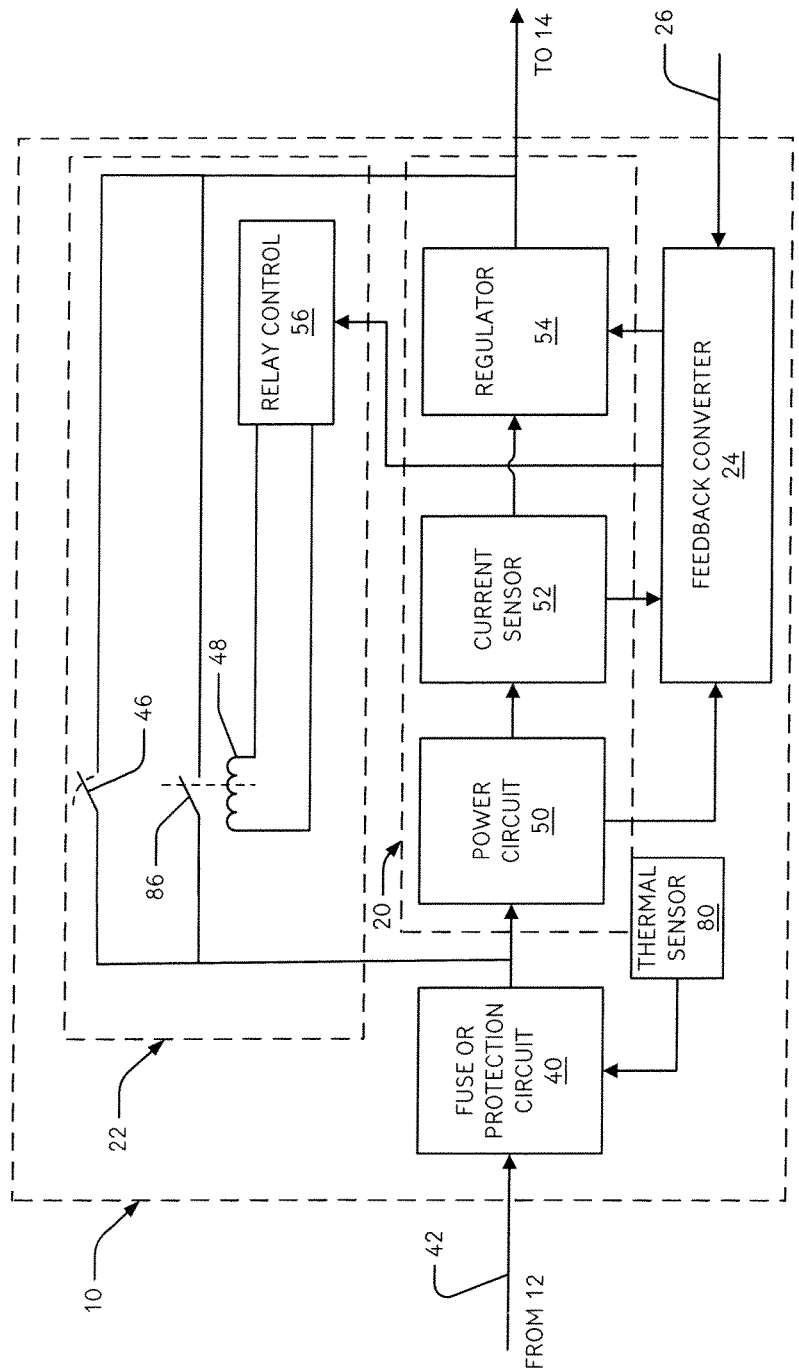
FIG. 4 is a schematic block diagram of an embodiment of the present invention.

In some embodiments and referring now to FIGS. 1 and 4, power from AC input power source 12 passes through a protection circuit and/or fuse 40. Protection circuit and/or fuse 40 can comprise conventional circuit protection devices such as a fuse, a circuit breaker, or a ground fault interrupter circuit (GFIC), or any combination thereof coupled in series between AC power input source 12 and AC controller 20. Unless otherwise explicitly excluded, protection circuit 40 may, in some embodiments, be a mechanical switch or an electrical switch. Some configurations include one or more thermal sensors 80 that either passively or actively senses a temperature of all or part of charger controller 10 and/or battery 18 and/or external manual battery charger 16 (the latter two sensors are not shown in the Figures). In response to thermal sensor or sensors 80, protection circuit 40 electrically removes AC input power source 12 and/or otherwise noncatastrophically deactivates charger controller 10. Power circuit 50, which receives power from protection circuit and/or fuse 40, includes a transformer in some embodiments. Also, in some embodiments, a portion of the power from power circuit 50 is used to power charger controller 10. In some other embodiments, charger controller 10 is powered by the voltage of battery 18 in some embodiments, either in addition to or instead of power from power circuit 50.

Some embodiments of the present invention provide a current sensor 52 between AC input power source 12 and external manual battery charger 16. Current sensor 52 senses an amount of current going to external manual battery charger 16 (or another parameter indicative of same) and provides an indication of the amount of sensed current to a feedback converter 24, which, as used herein, is a device that converts feedback signals and user inputs into suitable control signals as necessary. (If no conversion is necessary, the path through feedback converter 24 could comprise a wire or a solid trace on a circuit board.) Current sensor 52 in some embodiments comprises one or more of current transformer, a shunt, an inductor, or a Hall effect device, and is, in some embodiments, in communication with but electrically isolated from feedback converter 24.

In yet another embodiment, current sensor 52 and power circuit 50 are embodied in a single device or chip, and/or is housed in a single semiconductor package.

In some embodiments, including those illustrated in the Figures, current sensor 52 is bypassed when bypass circuit 22 is bypassing AC controller 20. In some other embodiments, current sensor 52 is outside of AC controller 20 in the sense that it is not bypassed when bypass circuit 22 is bypassing AC controller 20. These other embodiments may provide an advantage by allowing current sensor 52 to remain energized even when bypass circuit 22 is operated. One such embodiment, for example, has current sensor 52 between fuse or protection circuit 40 and power circuit 50 rather than between power circuit 50 and regulator 54.

As used herein, current sensor 52 is sometimes referred to as a "first current sensor" to distinguish it from other current sensors that may also be included in an embodiment.

Figure 5:
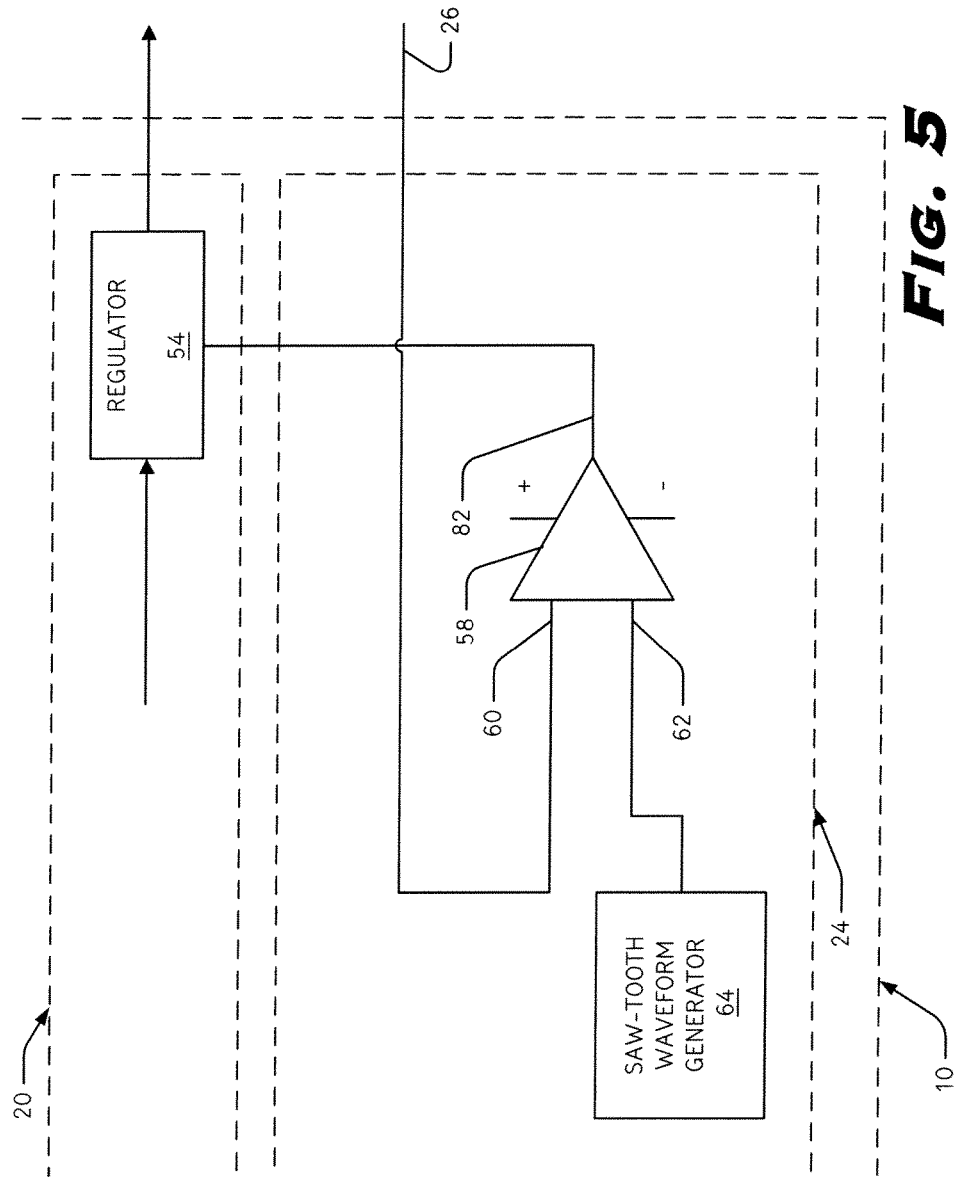
FIG. 5 is a detail of a first comparator circuit useful in embodiments of the present invention.
Figure 6:
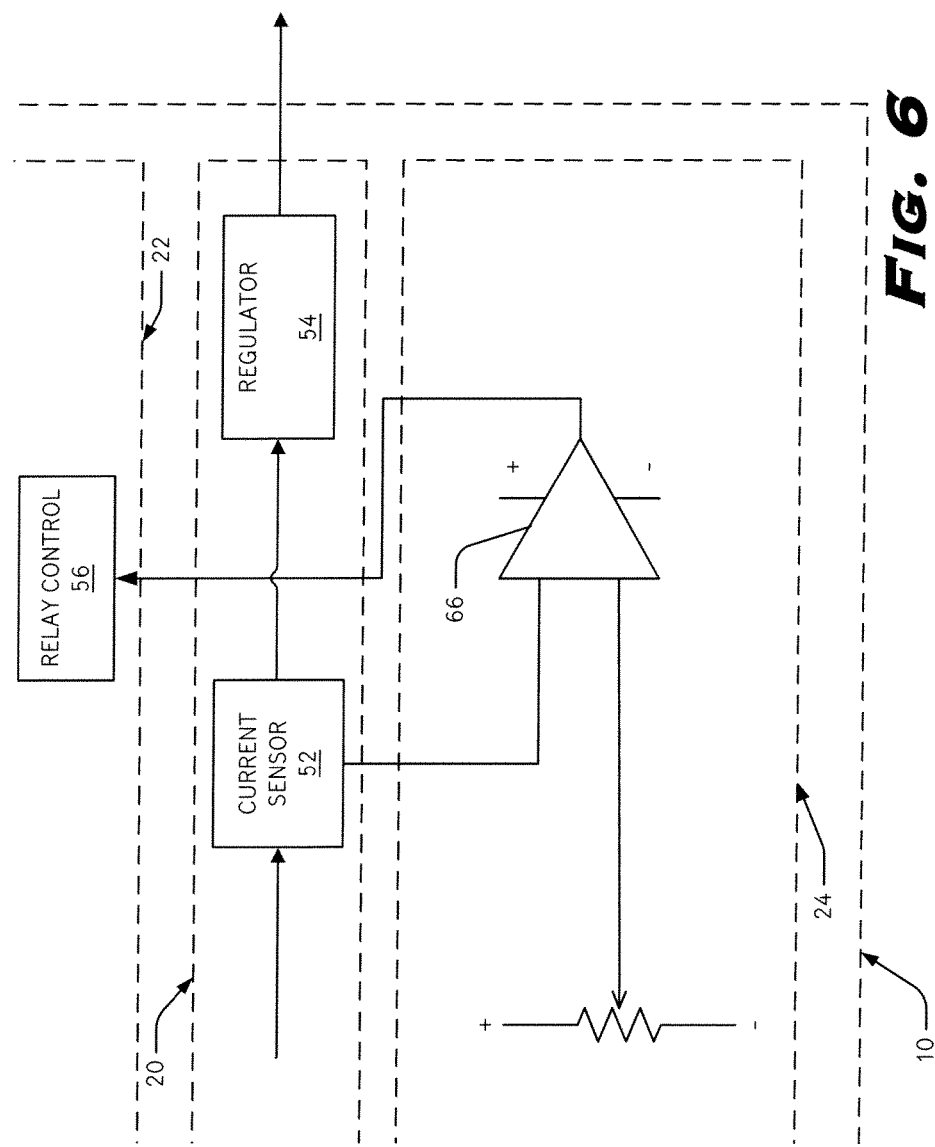
FIG. 6 is a detail of a second comparator circuit useful in embodiments of the present invention.

Some embodiments of feedback converter 24 utilize discrete analog components. For example and referring to FIG. 5, a first comparator 58 is used having a first comparator input 60 and a second comparator input 62. First comparator input 60 is coupled to a lead 26 that samples a voltage of battery 18, while second comparator input 62 is coupled to a saw-tooth waveform generator 64 synchronized to the sine wave AC voltage of AC input power source 12. In this manner, the battery voltage of battery 18 becomes a "monitored charging parameter." First comparator 58 is configured to produce a pulse width modulated (PWM) signal 82 (that is amplified, if necessary) to power and/or control a regulator 54 that provides power for an AC input of external manual battery charger 16. In some embodiments and referring to FIG. 6, a second comparator 66 is used to monitor AC current sensed by current sensor 52. This monitored AC current is also an example of a monitored charging parameter. If the sensed current exceeds a predetermined level, an automatic bypass switch (comprising, for example, relay control 56, coil 48, and switch 86) is operated to bypass regulator 54 (such as by magnetizing coil 48 to close switch 86 in the embodiment illustrated in FIG. 4) and allow a more direct path for current to flow from AC input power source 12 to external manual battery charger 16. This mode of operation is useful when helping to start a car using crank assist. As a design choice, various other components such as transistors, operational amplifiers, and electronic timers may be provided in some embodiments to enhance the operation of charger controller 10 and/or to provide a user-friendly control panel 36 (shown in FIG. 3) with controls and/or indicators 38.

Figure 7:
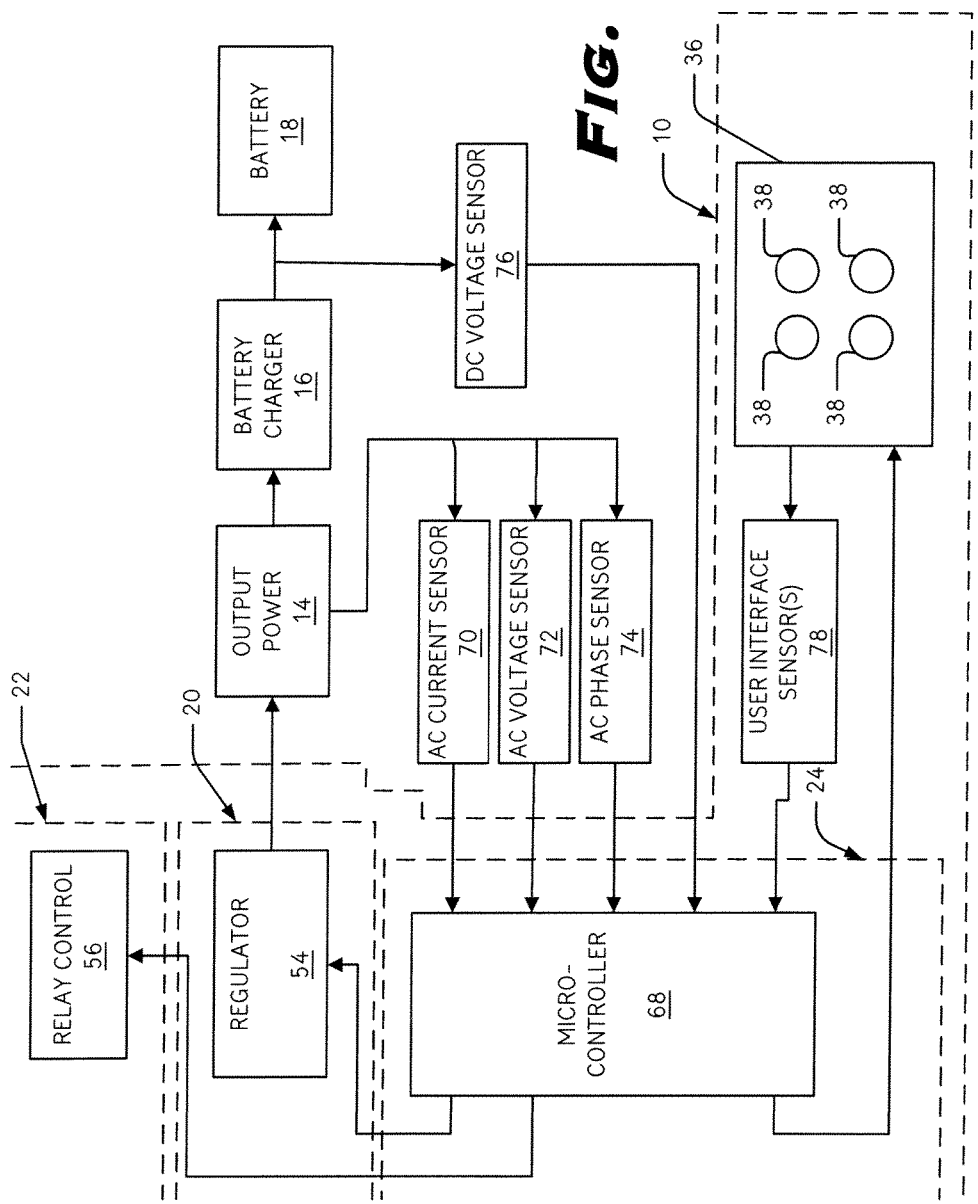
FIG. 7 is a detail of a microcontroller and associated circuitry useful in embodiments of the present invention.

Some embodiments of feedback converter 24 utilize digital electronic components either in addition to or in place of the analog components described above. For example and referring to FIG. 7, a suitable custom or off-the-shelf microcontroller 68 is provided with one or more sensors. In the embodiment illustrated in FIG. 7, there is an AC current sensor 70, an AC voltage sensor 72, an AC phase sensor 74, a DC voltage sensor 76, and one or more user interface sensors 78. User interface information provided by user interface sensors 78 may include, for example, indications of battery size, brand, and/or type. Each of the parameters sensed by sensors 70, 72, 74, 76, and 78 are also examples of monitored charging parameters. In some embodiments, microcontroller 68 also provides control outputs such as to regulator 54, relay control 56, and various indicators 38. Indicators 38 (which may, for example, be combined with buttons or comprise a touch-screen display or even an audible indicator) may include, for example, lights indicative of AC power being applied, the connection or disconnection state of battery 18, whether regulation is being applied to external manual battery charger 16, whether battery 18 is gassing, whether charging is finished, whether there is a fault in external manual battery charger 16, and/or whether charger controller 10 is operating on a manual override. To provide some of these indications, additional sensors not shown in the Figures may be required. Furthermore, it will be understood that when any or all of AC current sensor 70, AC voltage sensor 72, and AC phase sensor 74 are provided after regulator 54 (as shown in FIG. 7), these sensors are useful for monitoring battery health. However, it will be recognized that FIG. 7 is only a partial block diagram (as are also FIG. 5 and FIG. 6) of the apparatus. Thus, neither FIGS. 5, 6, nor 7 show all of the features present in any particular embodiment. More particularly, a current sensor 52 is not shown in FIG. 7, although it is provided for proper operation of regulator 54 in the illustrated embodiment.

In some embodiments, although not shown in the Figures, additional sensors and sensor inputs are provided to microcontroller 68 to enhance charging control by charger controller 10. Examples of such inputs include indications of battery 18 DC charging current, AC charging current output to external manual battery charger 16, battery 18 temperature, and ambient temperature.

As a design choice, some embodiments of the present invention use a combination of analog and digital components.

In some embodiments and referring again to FIG. 4, charger controller 10 includes a manual override switch 46 such as a physical override switch to allow external manual battery charger 16 direct access to AC input power source 12.

Regulator 54 regulates at least one power parameter applied to external manual battery charger 16. Examples of such power parameters include AC voltage, AC current, and AC power. In various embodiments, regulator 54 comprises one or more of a triac, a power transistor, a variable resistor, and/or a magnetic amplifier. Also, in some embodiments, regulator 54 is electrically isolated (or at least DC isolated) from feedback converter 24. Examples of suitable isolation devices include transformers, capacitors, magnetic components, relays, and/or optical couplers.

In some embodiments, the method used by charger controller 10 for regulating AC power to external manual battery charger 16 varies in accordance with the type or model of external manual battery charger 16 and/or battery 18. For example, the AC voltage, current and/or power going into external manual battery charger 16 is regulated to control the charging output of external manual battery charger 16. Changes are made in accordance with the type and model of battery 18, its real-time state of charge, and/or the type and model of external manual battery charger 16. In some cases, the changes may occur only once (e.g., to accommodate a specific type of battery 18 or external manual battery charger 16), or the changes may occur in real time (e.g., while the battery is charging), or in some combination thereof. The control parameters and/or algorithms used may be preset in accordance with battery manufacturer and/or charger manufacture specifications for one or more different types of batteries 18 and/or external manual battery chargers 16.

Figure 8:
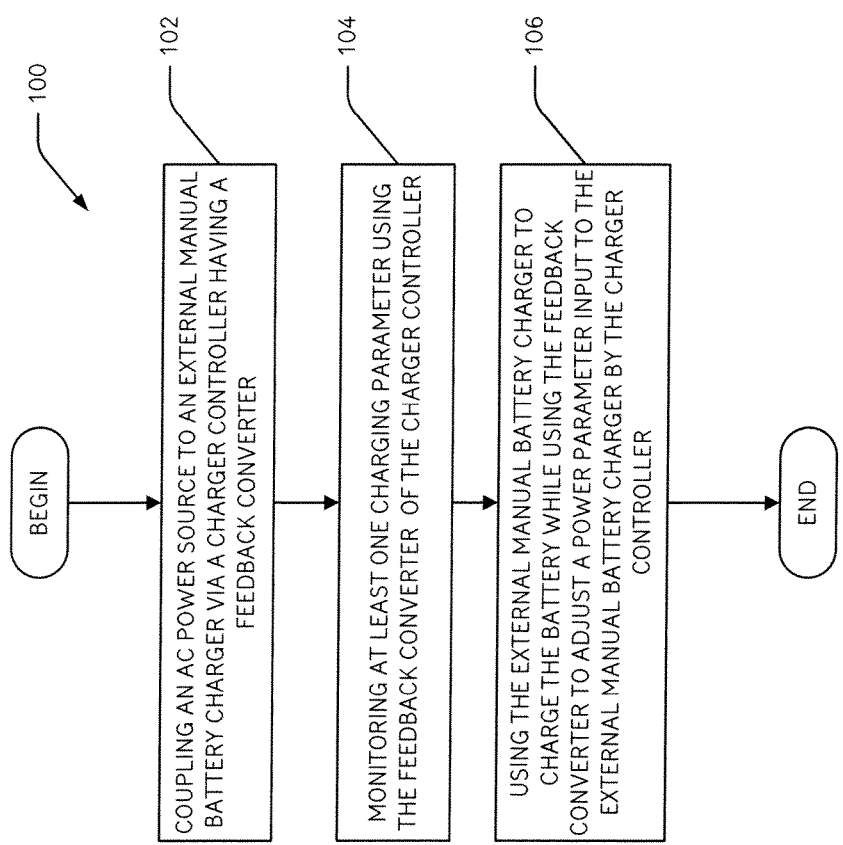
FIG. 8 is a flow chart illustrating a method embodiment of the present invention.

In some embodiments and referring to flow chart 100 of FIG. 8, a method for charging a battery 18 is provided. The method includes, at block 102, coupling an AC power source 12 to an external manual battery charger 16 via a charger controller 10 having a feedback converter 24. The method further includes, at block 104, monitoring at least one charging parameter using the feedback converter 24 of the charger controller 10. At block 106, the method further includes using the external manual battery charger 16 to charge the battery 18 while using the feedback converter 24 to adjust a power parameter input to the external manual battery charger 16 by the charger controller 10.

In some embodiments, the method further includes routing AC power around (rather than through) AC controller 20 to the external manual battery charger 16 at least when the battery 18 being charged is in a vehicle and the vehicle is also being started using crank assist. This bypassing is, in some embodiments, in response to a monitored charging parameter and can help prevent damage to AC controller 20 when very high current is needed to provide crank assist.

In some embodiments, the method further includes varying the power parameter using the charger controller 10 in accordance with at least one of battery type, battery model, external manual battery charger type, and external manual battery charger model.

It will be appreciated that some embodiments of the present invention provide apparatus or methods adequate for charging newer types of sealed batteries and to avoid damage to vehicle electronics and monitoring systems while reducing the cost of same by continuing to utilize existing manually controlled battery chargers.

While the invention has been described in terms of various specific embodiments, those skilled in the art will recognize that the invention can be practiced with modification within the spirit and scope of the claims.

The invention claimed is:

1. An apparatus for operating an external manual battery charger having a first AC power input and a DC charging output, said apparatus comprising:
an AC controller configured to adjust at least one power parameter supplied to the AC power input of the external manual battery charger over a range of positive operating conditions, said at least one power parameter including at least one member of the group consisting of AC current, AC voltage and AC power;
a feedback converter configured to monitor at least one charging parameter and to control the AC controller to adjust said at least one power parameter over said range of positive operating conditions in accordance with said monitored at least one charging parameter, said at least one charging parameter comprising a battery voltage of a battery being charged by the external manual battery charger; and an automatic bypass switch responsive to said feedback converter to bypass the source of AC power around said AC controller;

wherein said AC controller and said feedback converter are in an enclosure, and said enclosure is separate from the external manual battery charger.

2. An apparatus in accordance with claim 1 having a second AC power input separate from the first AC power input of the external manual battery charger and an AC power output, said AC power input of said apparatus coupled in series with at least one of a fuse and a protection circuit between a source of AC power and said AC controller to protect said apparatus.

3. An apparatus in accordance with claim 2 wherein said apparatus includes said protection circuit, and said protection circuit is responsive to a thermal sensor within said apparatus.

4. An apparatus in accordance with claim 2 further comprising a first current sensor, and further wherein said AC controller comprises a power circuit and a regulator, said feedback converter responsive to at least one of said power circuit and said first current sensor to control said regulator to vary at least one said power parameter.

5. An apparatus in accordance with claim 4 wherein said AC controller comprises said current sensor, so that, when AC power is bypassed around said AC controller, it is bypassed around said first current sensor.

6. An apparatus in accordance with claim 4 further configured so that when AC power is bypassed around said AC controller, said first current sensor is configured to remain powered.

7. An apparatus in accordance with claim 4 wherein said apparatus further comprises a manual bypass circuit configured to bypass the source of AC power around said AC controller.

8. An apparatus in accordance with claim 7 wherein said AC controller comprises said current sensor, so that, when AC power is bypassed around said AC controller, it is bypassed around said first current sensor.

9. An apparatus in accordance with claim 7 further configured so that when AC power is bypassed around said AC controller, said first current sensor is configured to remain powered.

10. An apparatus in accordance with claim 1 further comprising a first comparator having a first comparator input and a second comparator input, wherein said first comparator input is responsive to a battery voltage of the battery being charged and said second comparator input is responsive to a sine wave of an AC input power source, and said comparator configured to generate a pulse width modulated (PWM) signal, and said AC controller further comprising a regulator configured to provide power for an AC input of the external manual battery charger, and said regulator responsive to said pulse width modulated (PWM) signal.

11. An apparatus in accordance with claim 10 further comprising a second comparator, and wherein said AC controller further comprises a current sensor; and said second comparator responsive to said current sensor to operate the automatic bypass switch to bypass AC power around the AC controller.

12. An apparatus in accordance with claim 1 further comprising a microcontroller responsive to at least one sensor selected from the group consisting of an AC current sensor, an AC voltage sensor, an AC phase sensor, and a DC voltage sensor, and wherein said microcontroller is responsive to said at least one sensor to control at least one member of the group consisting of a regulator, an automatic bypass device control, and an indicator.

13. An apparatus in accordance with claim 12 wherein said AC controller comprises said regulator, and said apparatus further comprising a control panel configured to permit a selection of at least one of battery type, battery model, external manual battery charger type and external manual battery charger model; and wherein said microcontroller responsive to said selection to operate said regulator to adjust said at least one power parameter.

14. An apparatus in accordance with claim 12 having a second AC power input separate from the first AC power input of the external manual battery charger and an AC power output, said AC power input of said apparatus coupled in series with at least one member of the group of protection components consisting of a fuse and a protection circuit, said at least one member coupled between a source of AC power and said AC controller to protect said AC controller.

15. An apparatus in accordance with claim 14 wherein said apparatus includes said protection circuit, and said protection circuit is responsive to a thermal sensor within said apparatus.

16. An apparatus in accordance with claim 14 further comprising a first current sensor, and further wherein said AC controller comprises a power circuit and said regulator, said feedback converter responsive to at least one of said power circuit and said first current sensor to control said regulator to vary at least one said power parameter.

17. An apparatus in accordance with claim 16 wherein said AC controller comprises said first current sensor, so that, when AC power is bypassed around said AC controller, it is bypassed around said first current sensor.

18. An apparatus in accordance with claim 16 further configured so that when AC power is bypassed around said AC controller, said first current sensor is configured to remain powered.

19. An apparatus in accordance with claim 16 wherein said apparatus further comprises a manual bypass circuit to bypass the source of AC power around said AC controller.

20. An apparatus in accordance with claim 19 wherein said AC controller comprises said first current sensor, so that, when AC power is bypassed around said AC controller, it is bypassed around said first current sensor.

21. An apparatus in accordance with claim 19 further configured so that when AC power is bypassed around said AC controller, said first current sensor is configured to remain powered.

22. A method for charging a battery comprising:
coupling an AC power source to an external manual battery charger via a charger controller having a feedback converter, wherein the charger controller comprises an automatic bypass switch responsive to said feedback converter to bypass a source of AC power around said charger controller;
monitoring at least one charging parameter using the feedback converter of the charger controller; and
using the external manual battery charger to charge the battery while using the feedback converter to adjust a power parameter input over a range of positive operating conditions to the external manual battery charger by the charger controller.

23. A method in accordance with claim 22 further comprising bypassing AC power from the AC power source to the external manual battery charger at least when the battery being charged is in a vehicle and the vehicle is also being started using crank assist.

24. A method in accordance with claim 23 wherein said bypassing is in response to a monitored charging parameter.

25. A method in accordance with claim 22 further comprising varying said power parameter using the charger controller in accordance with at least one member of the group consisting of battery type, battery model, external manual battery charger type, and external manual battery charger model.

* * * * *